Aug. 6, 1935.  G. M. HARTSOCK  2,010,718
FREEWHEELING TRANSMISSION
Filed Nov. 28, 1930  4 Sheets-Sheet 1

INVENTOR.
Guy M. Hartsock
BY P. W. Pomeroy
ATTORNEY.

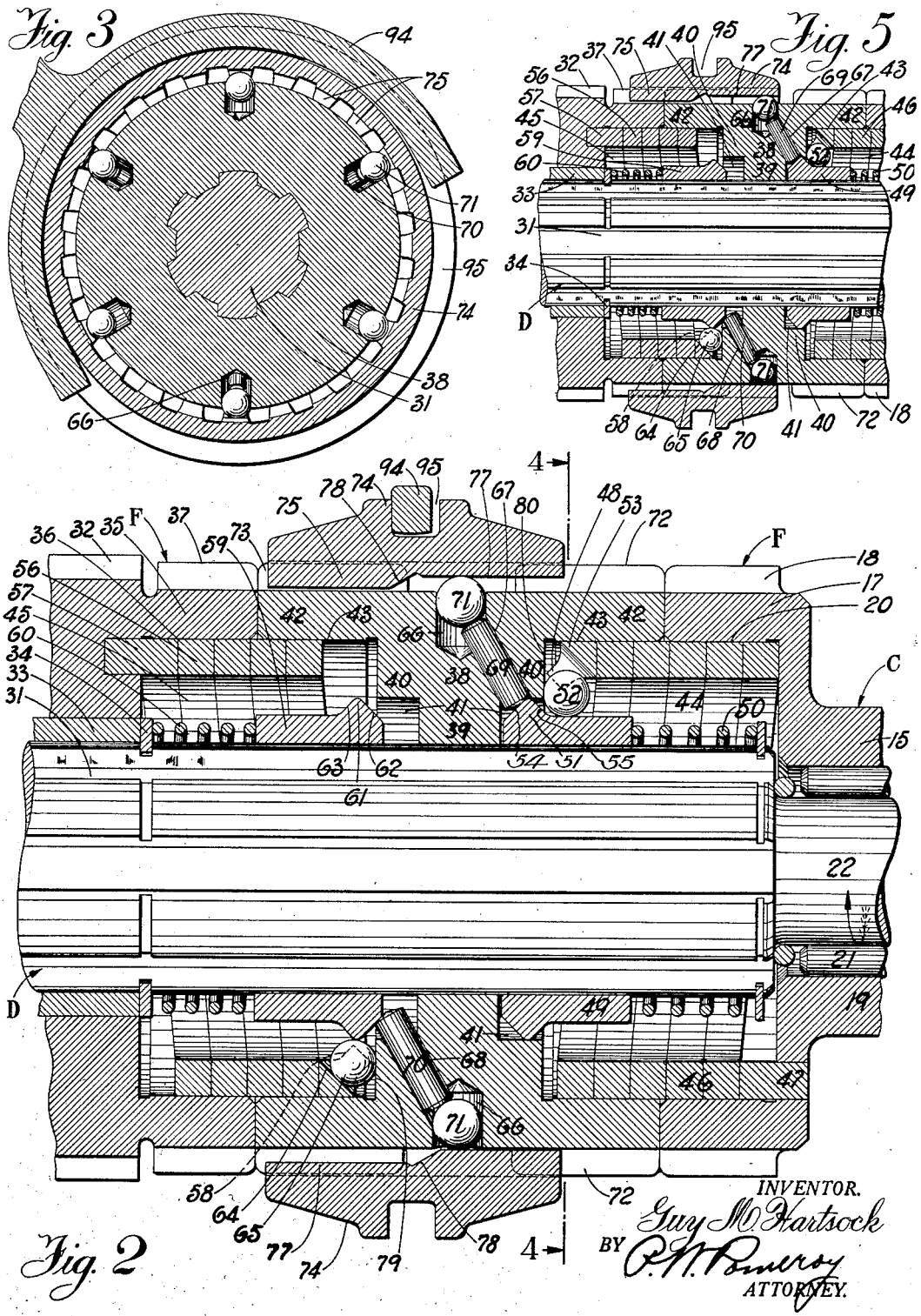

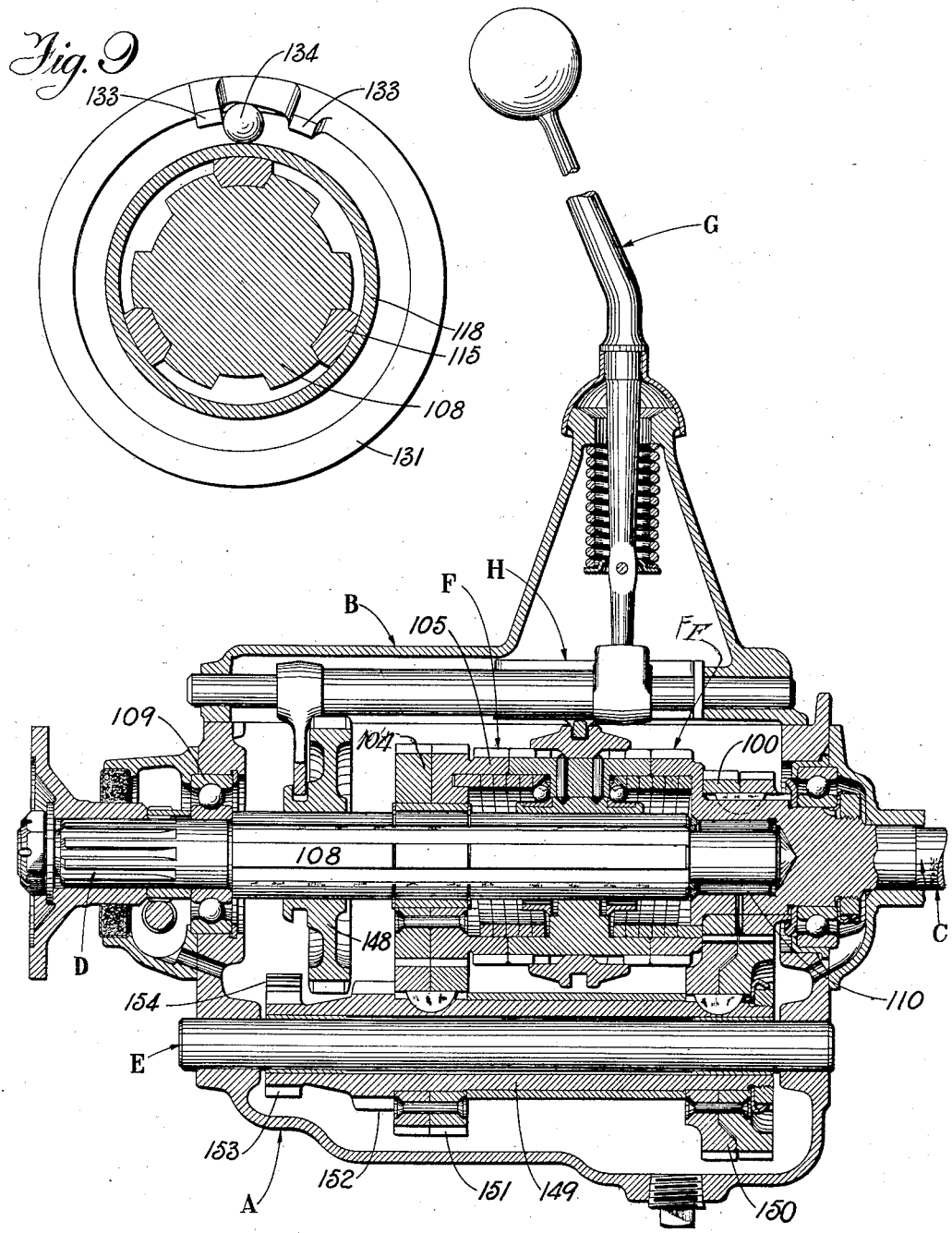

Aug. 6, 1935.  G. M. HARTSOCK  2,010,718
FREEWHEELING TRANSMISSION
Filed Nov. 28, 1930  4 Sheets-Sheet 4
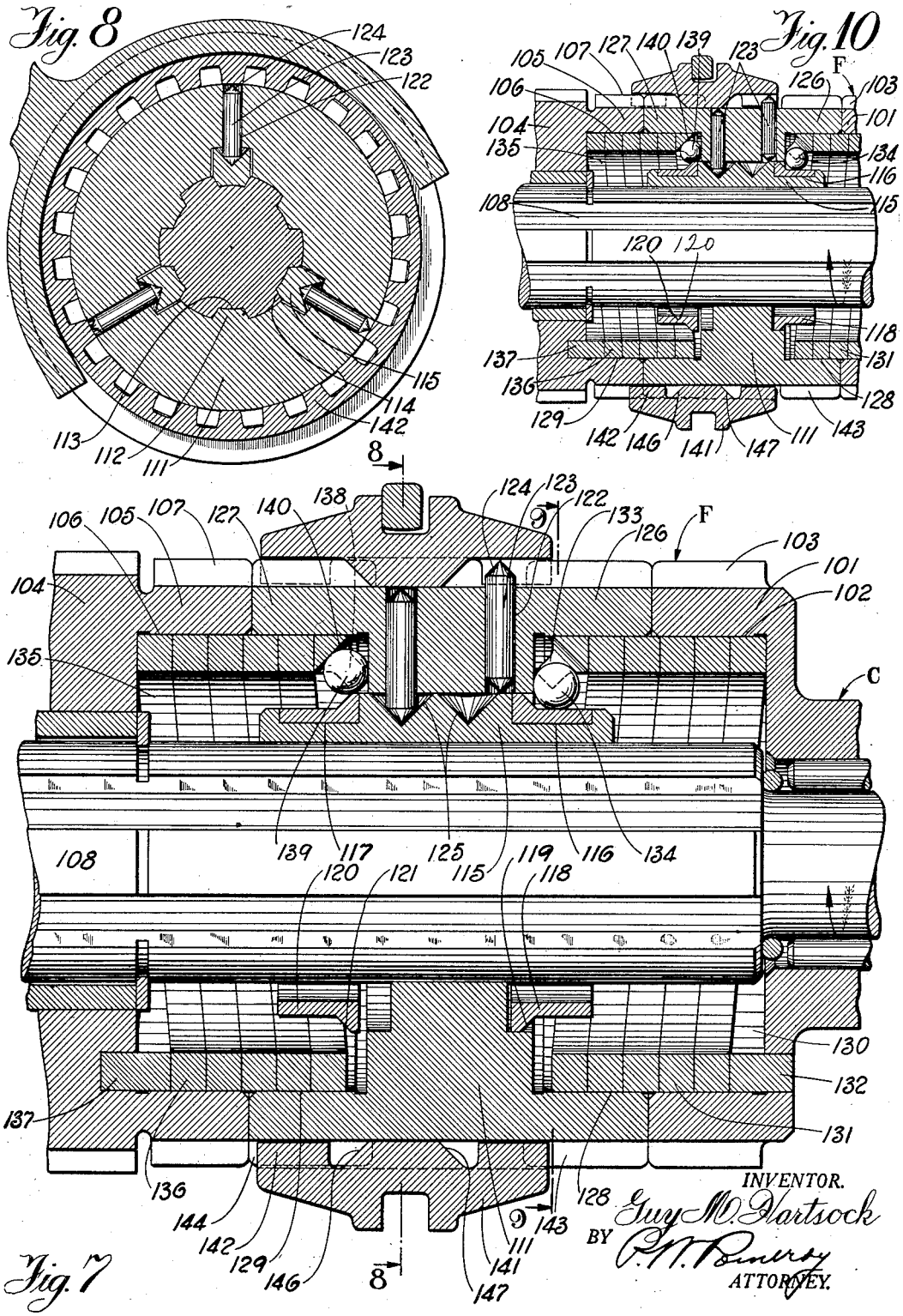

Patented Aug. 6, 1935

2,010,718

UNITED STATES PATENT OFFICE 2,010,718

FREEWHEELING TRANSMISSION

Guy M. Hartsock, South Bend, Ind., assignor, by mesne assignments, to The Studebaker Corporation, South Bend, Ind., a corporation of Delaware Application November 28, 1930, Serial No. 498,662

12 Claims. (Cl. 192—48)

This invention relates to improvements in free wheeling transmissions and deals more specifically with such transmissions in which a plurality of clutches are provided to permit a one-way drive at engine speed or at less than engine speed.

A further object of the invention is to provide a transmission of the abovementioned type wherein the overrun or free wheeling may be permitted or prevented at the will of the operator.
Still another object of the invention is to provide a novel form of overrunning clutch structure in a variable speed transmission mechanism to provide free wheeling at certain speed settings of the mechanism.
A still further object of the invention is to provide a novel, simple and economical construction of variable speed transmission embodying all of the above referred to advantages.

Other objects and advantages of the invention will be apparent during the course of the following description.

In the accompanying drawings forming a part of this specification and in which like numerals are employed to designate like parts throughout the same:

Figure 1 is a vertical longitudinal sectional view through one form of variable speed transmission mechanism wherein overrunning or free wheeling is provided in certain forward drive settings.
Figure 2 is a fragmentary longitudinal vertical sectional view and shows in detail the overrunning or free wheeling mechanism employed as a part of two of the different forward speed settings, one of the overrunning clutch portions of this mechanism being illustrated as set to cause a drive at this speed but to permit the driven member to overrun with respect to the driving member.

Figure 3 is a transverse sectional view taken on the line 3—3 of Figure 1 through the central portion of the mechanism.

Figure 5 is a similar view to Figure 2 but illustrates the controlling mechanism shifted to cut out or prevent the free wheeling or overrun in the drive setting illustrated in Figure 2.

Figure 6 is a similar view to Figure 1 but illustrates a slightly modified form of overrunning clutch structure and its control.

Figure 7 is a similar view to Figure 2 but illustrates the type of clutch structure shown in Figure 6.

Figure 8 is a detail transverse sectional view taken on line 8—8 of Figure 7.

Figure 9 is a transverse sectional view taken on the line 9—9 of Figure 7 which view is similar to Figure 4.

Figure 10 is a similar view to Figure 5 but illustrates the form of transmission shown in Figure 7 with the controlling mechanism shifted to prevent the free wheeling or overrun of the driven shaft relative to the driving shaft.

Figures 1, 4:
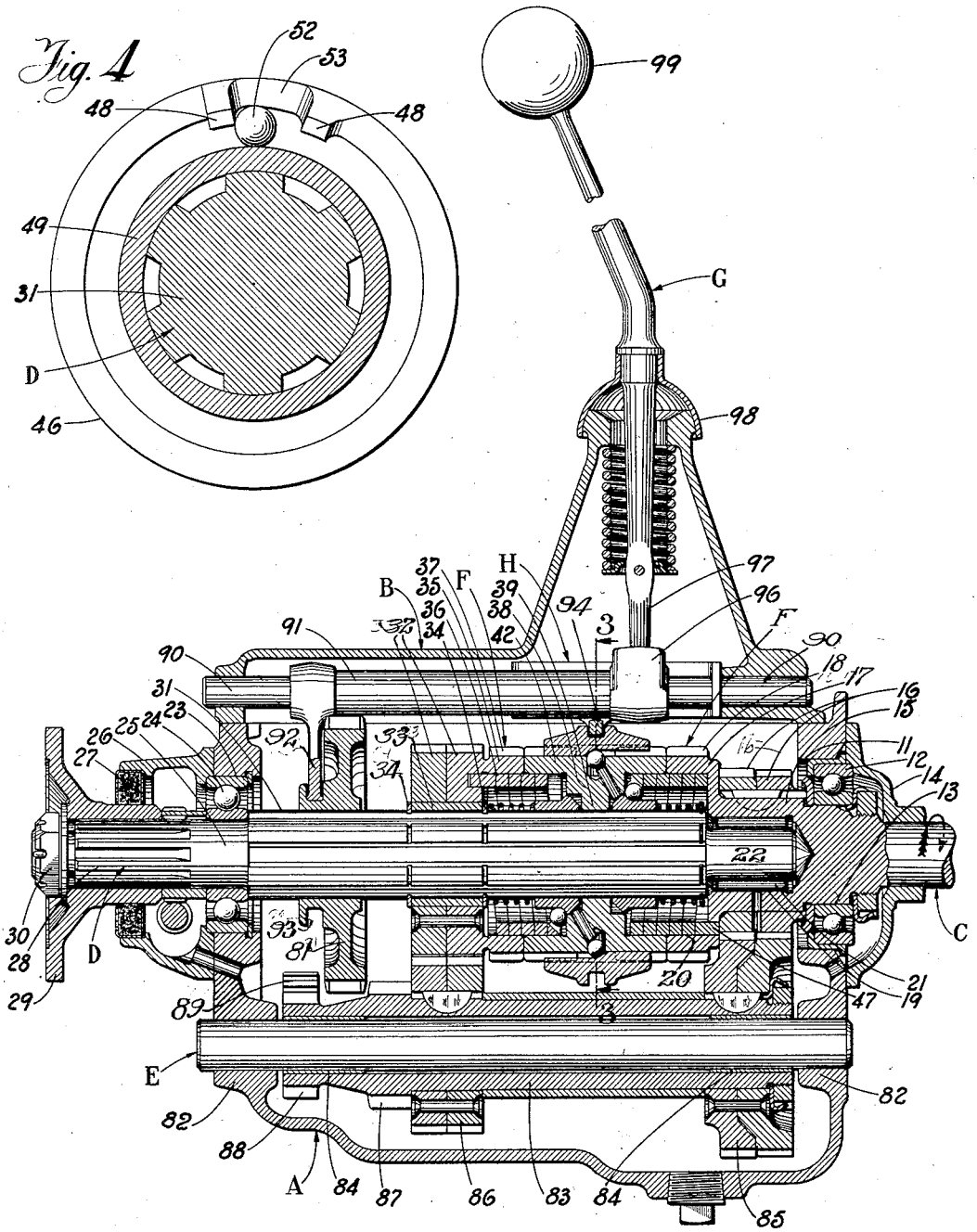
Figure 4 is a detail transverse sectional view taken on the line 4—4 of Figure 2, disclosing one end portion of one of the coiled spring clutch members.

For the purpose of enabling those skilled in the art to arrive at a rapid understanding of the construction and mode of operation of the two different forms of transmissions embodied in this invention, the same will be briefly described.

Each transmission includes a casing A having a top closure or cover portion B suitably secured to the top thereof. Projecting into the transmission casing at one end is a drive shaft C, while projecting outwardly from the transmission casing at its opposite end and in axial alignment with the drive shaft C is a driven or transmission shaft D. A counter shaft E also is supported in the transmission casing, in each form of mechanism, and a plurality of trains of gears and of mechanical elements is employed for driving the driven shaft D at various forward speeds and in a reverse direction from the drive shaft. Two of these speed settings for driving in a forward direction are provided with overrunning clutch structures F which will permit the driven shaft D to overrun under its own momentum with respect to the drive shaft C when the driven shaft is being driven by the vehicle.

The various speed settings of the transmission are accomplished by means of a gear shift lever G which is supported in a suitable manner by a portion of the cover B. This gear shift lever G operates shifter mechanism H whereby the operator of a vehicle, or the like, equipped with either one of these transmissions may set the latter for any desired forward speed and for drive in a reverse direction. For certain forward speeds, the operator may set the transmission to permit overrun of the driven shaft relative to the drive shaft or to prevent such overrun as desired.

The detail features of construction in connection with the form of transmission shown in Figures 1 to 5 inclusive now will be described. It is to be understood, however, that the details illustrated in these figures are merely intended to represent a preferred embodiment of this invention.

The casing A is provided with an opening 11 at one end for receiving an anti-friction bearing structure 12 which encircles an enlarged portion 13 of the drive shaft C. This anti-friction bearing 12 supports the drive shaft in the manner clearly illustrated. A closure cap 14 loosely encircles the drive shaft and is secured in any suitable manner to the end wall of the casing A for the purpose of excluding foreign matter from the bearing 12 and the interior of the casing. The drive shaft C is further increased in diameter at the portion 15 and has keyed thereto the two parts 16 of a herring bone gear. This gear is made in two parts to facilitate manufacture of the same and the parts may be connected together in any desired manner or if desired a spur gear may be substituted therefor. Inwardly of the enlarged portion 15, the drive shaft is further increased in diameter at the portion 17 and is provided externally with an annular series of teeth 18, the operation of which will be described in detail at a later point. The portions 15 and 17 of the drive shaft are hollowed out as at 19 and 20. The hollowed out portion 19 houses the anti-friction roller members 21 and the inner reduced end 22 of the driven shaft D. This mounting for the inner end of the driven shaft insures axial alignment of the drive and driven shafts and yet permits relative rotation between these shafts. The hollowed out portion 20 of the drive shaft C is concentric with the remainder of the shaft and constitutes one pocket of a coiled spring clutch housing. This clutch will be described in detail at a later point.

The casing A is provided with a second opening 23 arranged in axial alignment with the opening 11 and functions to receive an anti-friction bearing 24 which encircles a smooth portion 25 of the driven shaft D. This anti-friction bearing structure 24, of course, supports the outer end of the driven shaft. A closure cap or cover 26 is suitably secured at its inner end portion to the end wall of casing A and cooperates with the packing 27 to prevent entrance of foreign matter into the bearing 24 and into the interior of the casing.

Outwardly of the smooth portion 25 of the driven shaft, the latter is provided with a splined portion 28 on which is mounted a driving flange 29, the said flange being held in place by means of a nut and washer structure 30 suitably connected to the end of the driven shaft.

Inwardly of the smooth portion 25 of the driven shaft D, the latter is provided with a splined portion 31 which extends uninterruptedly to the reduced portion 22 of the driven shaft which is telescopically associated with the enlarged part 15 of the drive shaft.

Loosely encircling the splined portion 31 of the driven shaft is a herring bone gear 32 which is formed of two interconnected parts to facilitate manufacture. This herring bone gear is mounted upon a wear-resisting bushing or bearing 33 which loosely encircles the splined portion 31 of the driven shaft. This herring bone gear 32 with its bearing 33 is prevented from axial movement relative to the shaft D by means of the split retaining rings 34. The inner part of the herring bone gear 32 is provided with a concentric extension 35 which is hollowed out at 36 to form a pocket which functions as a part of a coiled spring clutch housing. Arranged around the circumference of this enlarged, pocketed portion 35 of the herring bone gear 32 is a set of teeth 37. Although I have shown and described the gear 32 as having herring bone teeth, a spur gear can be substituted if desired although the former is preferred.

It will be noted that the enlarged portion 17 of the drive shaft and the concentric extension 35 of the herring bone gear 32 loosely encircle the driven shaft D and are maintained in fixed axial relation with respect to each other. Positioned between these two pocketed portions 17 and 35 is a member 38 which is splined to the portion 31 of the driven shaft. This member 38 has the inwardly extending portion 39 which directly engages the driven shaft and is splined thereto. Radially outwardly of the portion 39, the member 38 is enlarged axially to form the oppositely projecting parts 40. These portions 40 overhang the driven shaft and form annular grooves 41 with the underlying portions of the driven shaft. Radially outwardly of the enlarged portion 40 of the member 38, this member is increased in axial length to form the concentric annular extensions 42 which are hollowed out to provide pockets 43.

It will be noted by inspecting Figures 1 and 2 that the pocket 20 formed in the enlargement 17 of the drive shaft C is co-axial with one pocket 43 formed in the extending portion 42 of the member 38. These pockets 20 and 43 also are of the same diameter and collectively produce a housing 44. It further will be noted that the pocket 36 formed in the extension 35 of the herring bone gear 32 and the other pocket 43 formed in the extension 42 of the member 38 are co-axially arranged and are of equal diameter. These two pockets 36 and 43 form a housing chamber 45.

A coiled clutch spring 46 is housed in the chamber 44 and has one axially bent end 47 anchored to the enlarged portion 17 of the drive shaft C. It is to be understood that the outside diameter of this coiled clutch spring 46 is slightly less than the inside diameter of the pockets 20 and 43 which form the chamber 44. The free end of the spring 46 is formed with a pair of spaced ears 48, as best illustrated in Figure 4. These ears extend radially inwardly and axially outwardly of the end of the spring 46. Encircling the portion 31 of the driven shaft is a cam sleeve 49 which normally is urged by a spring 50 in the direction of the portion 39 of the member 38 or with its inner camming end 51 located within the pocket 41 formed on the right hand side of the portion 39, as seen in Figures 1 and 2. A wedging or expanding ball 52 is positioned between the ears 48 of the spring 46 and the cam sleeve 49. It will be noted that the end of the spring 46 between the ears 48 is formed with a longitudinally extending surface 53 which is arranged at an oblique angle with reference to the axis of the driven shaft. The camming end 51 of the sleeve 49 is formed with opposed camming surfaces 54 and 55.

The chamber 45 formed by the pockets 36 and 43 houses a coiled spring 56 which has its end 57 secured to the herring bone gear 32. The outside diameter of this coiled spring 56 is slightly less than the inside diameters of the pockets 36 and 43. The free end of this spring 56 also is provided with circumferentially spaced ears 58. A slidable cam sleeve 59 encircles the splined portion 31 of the driven shaft and is urged axially toward the portion 39 of the member 38 by the spring 60. This cam sleeve 59 is formed with a camming end 61 having opposed surfaces 62 and 63.

The spring 60 normally urges this inner camming end 61 of the sleeve 59 into the annular groove 41 formed between the portion 40 of the member 38 and the splined portion 31 of the driven shaft D. An obliquely arranged surface 64 also is provided on the end portion of the spring 56 between the ears 58. A wedging or expanding ball 65 is positioned between the ears 58 and the camming sleeve 59.

At equi-spaced intervals around the periphery of the member 38 radially inwardly extending pockets 66 are formed. These pockets open outwardly through the outer surface of the member 38. By inspecting Figure 3, it will be seen that there are six of these pockets 66. Three of the pockets arranged at 120° relative to each other have holes 67 drilled through the member 38 to open into the annular groove 41 associated with the camming sleeve 49. These drill holes 67 are arranged at oblique angles with reference to the axis of the driven shaft. The remaining three pockets 66 have holes 68 drilled obliquely in the opposite direction with reference to the holes 67 and open at their inner ends into the annular groove 41 adapted for housing the inner end of the cam sleeve 59. The holes 67 are provided with plunger pins 69 which project at their outer ends into the pockets 66 and at their inner ends into the right hand groove 41. The holes 68 are provided with plunger pins 70 which project at their outer ends into the holes 66 and at their inner ends into the annular groove 41 positioned at the left of the member 38 as illustrated in Figures 1 and 2. Each one of the holes 66 is provided with a plunger actuating ball 71 and these balls bear against the outer ends of the plunger pins 69 and 70.

The axially projecting portions 42 of the member 38 have formed on their peripheries the sets of teeth 72 and 73. Encircling the member 38 is a shifter collar 74 which, as best shown in Figure 3, has a plurality of radially inwardly projecting teeth 75. These teeth 75 cooperate with the teeth 72 and 73 to act as a spline connection between the shifter collar 74 and the member 38. The teeth 75 are formed within the shifter collar 74 and have cut-away portions 77 which form camming surfaces 78. The teeth 75 have their cut-away portions 77 at opposite ends so that the camming surfaces 78 are presented in opposite directions.

In Figure 1, the shifter collar 74 is arranged in what will be termed its neutral position, that is, with the balls 71 associated with the two sets of pins 69 and 70 located in the cut-out portions 77 of the teeth 75 and abutting against the cam surfaces 78 of these teeth 75. With the shifter collar located in this neutral position, the springs 50 and 60 are permitted to urge the cam sleeves 49 and 59 into positions where their camming ends 51 and 61 are located in the grooves 41. The camming surfaces 54 and 62 of the sleeves 49 and 59 will urge the sets of pins 69 and 70 outwardly to maintain the plunger operating balls 71 in the positions described in connection with Figure 1.

In Figure 2, the shifter collar 74 is illustrated as having been moved to the left or toward the herring bone gear 32. This movement of the collar 74 will cause the cam surfaces 78 of the teeth 75 cooperating with the set of plunger pins 69 to move away from the balls 71. The shifter collar 74 will be moved to cause the camming surfaces 78 to force the balls 71 cooperating with the plunger pins 70 inwardly of the pockets 66 for forcing the pins 70 axially inwardly through the holes 68. The inner ends of these pins 70 are formed with camming surfaces which cooperate with the camming surface 62 of the sleeve 59 and will cause this sleeve to move axially against the force of the spring 60. This axial movement of the sleeve 59 will cause its cam surface 63 to move the ball 65 radially into engagement with the oblique surface 64 formed on the end portion of the spring 56. The ball 65, in bearing against this oblique surface 64 and the surface 79 of the member 38, will cause the spring 56 to be slightly compressed axially which will cause a slight expansion of the convolutions of the spring into light, gripping engagement with the walls of the pockets 36 and 43.

With the convolutions of the spring 56 lightly engaging the pockets 36 and 43, rotation of the herring bone gear 32 in one direction will cause the spring 36 to expand to a greater extent for gripping the walls of the pockets 36 and 43 to drivingly connect the herring bone gear 32 to its axial projection 42 of the member 38. If the member 38 is driven in the same direction at a higher rate of speed than the herring bone gear 32, this relative movement will cause the spring 56 to contract for releasing the member 38 from the herring bone gear. In this way, an overrunning clutch action is provided.

When the shifter collar 74 is moved axially in the opposite direction, the plunger pins 70 will not be moved inwardly, as illustrated in Figure 2. The plunger pins 69, however, will be moved axially inwardly due to the longitudinal movement of the teeth 75 associated with the balls 71 engaging these pins 69. The cam surfaces 78 will move the balls 71 engaging the pins 69 inwardly of the pockets 66 for causing axially inward movement of the pins 69. This movement of the pins 69 will shift the camming sleeve 49 axially against the force of the spring 50 and the camming surface 55 of the sleeve 49 will move the ball 52 radially outwardly into engagement with the oblique surface 53 and the surface 80 of the member 38. As described in connection with the operation of the spring 56, this outward movement of the ball 52 will cause the spring 46 to be compressed axially and thereby slightly expanded into light frictional engagement with the pockets 28 and 43. With the spring thus lightly engaging the pockets 20 and 43, rotation of the drive shaft C in a clockwise direction will cause the spring 46 to be unwound or expanded for placing the convolutions of said spring into tight gripping engagement with the walls of the pockets 20 and 43. Should the member 38, splined to the driven shaft D, rotate at a higher rate of speed than the speed of rotation of the drive shaft C, the spring 46 will be wound up or compressed to move it out of tight frictional engagement with the walls of the pockets 20 and 43, for permitting overrun of the driven shaft member 38 relative to the drive shaft C.

In Figure 5, the shifter collar 74 is illustrated as having been moved to a greater extent than the movement illustrated in Figure 2. The collar 74, as shown in Figure 5, is moved to connect or key together the sets of teeth 37 and 73. With the shifter collar in this position, the herring bone gear 32 will be locked against rotation relative to the member 38, and the herring bone gear and driven shaft will be interconnected to prevent overrun. It is to be understood that the collar when shifted in the opposite direction may be moved a sufficient extent to lock together the sets of teeth 18 and 72 whereby the drive shaft C and the driven shaft member 38 will be held against relative rotation to prevent the overrunning action which may be accomplished by means of the coiled clutch spring 46.

Slidably splined upon the portion 31 of the driven shaft D located between the bearing 24 and the herring bone gear 32 is a gear 81. This gear may be moved axially with respect to the driven shaft but will rotate therewith at all times.

The counter shaft E is supported against rotation in the bosses 82 formed on the casing A. This counter shaft has a sleeve 83 freely rotatably mounted thereon through the medium of wear-resisting bearings 84. A two-part herring bone gear 85 is keyed to one end of the sleeve 83 and constantly meshes with the herring bone gear 16 keyed to the drive shaft C. A second two-part herring bone gear 86 is keyed to the sleeve 83 and constantly meshes with the herring bone gear 32 loosely mounted upon the driven shaft. If spur gears are substituted for the herring bone gears 16 and 32, it will be understood that spur gears will likewise be substituted for the herring bone gears 85 and 86, and it will be further understood that the gears 85 and 86 may be formed integral with the sleeve 83 if so desired. The sleeve 83 has formed integral therewith a gear 87 which is located adjacent to the herring bone gear 86. A second gear 88 is formed integral with the sleeve 83 in axial spaced relation with respect to the gear 87. The gear 88 constantly meshes with an idler pinion 89 supported by an idler shaft, not shown, and located beyond the counter shaft E in the disclosure of Figure 1.

The gear 81 is movable into two operative positions, one in mesh with the gear 87, and in the other position in mesh with the idler pinion 89.

The shifter collar 74 and the gear 81 are moved by means of the control mechanism H. This mechanism includes two parallel rods 90, only one of which is shown in Figure 1. On each one of these rods there is mounted a shifter sleeve 91. The shifter sleeve illustrated in Figure 1 has secured thereto a shifter fork 92 which engages the gear 81 through the medium of the annular groove 93. The second shifter sleeve 91 carries a shifter fork 94, which is shown in Figure 2 as being received in the groove 95 formed in the shifter collar 74. Each one of these shifter sleeves 91 is formed with a control head 96 which is designed to be selectively engaged by the inner end 97 of the gear shift lever G. This gear shift lever is mounted for universal movement by means of the supporting structure 98 and includes the operating knob 99 at its outer end.

The operation of this variable speed transmission mechanism will now be described:

Drive shaft C is intended to be connected in any suitable manner, such as through a clutch, not shown, to an engine shaft for causing the drive shaft to rotate in the direction of the arrow shown in Figure 1. If the driven or transmission shaft D is to be rotated at first or low speed in a forward direction, the gear shift lever G is operated to move the gear 81 into mesh with the gear 87. The drive then will be from the drive shaft C through the herring bone gears 16 and 85 to the sleeve 83 and from the integral gear 87 on this sleeve to the gear 81 which is splined to the driven shaft.

When it is desired to drive the driven shaft in a forward direction at second or intermediate speed, the gear shift lever G is first returned to its neutral position which disengages the gear 81 from the gear 87 and in passing through this neutral position into second speed position, the shifter collar 74 will be moved into the position illustrated in Figure 2. This movement of the collar 74 will cause the plunger pins 70 to shift the cam sleeve 59 longitudinally of the driven shaft for camming the ball 65 radially outwardly into engagement with the oblique surface 64 of the spring 56 and the surface 79 of the driven shaft member 38. The ball 65 will ride up the cam surface 63 of the sleeve 59 until it reaches the apex formed by the cam surfaces 62 and 63. With the ball in this position, the spring 56 will be compressed axially which will cause it to expand into light frictional engagement with the walls of the pockets 36 and 43. The drive then will be from the drive shaft C to the sleeve 83 through the herring bone gears 16 and 85 and from the gear 86 to the herring bone gear 32. This gear 32 will be rotated in a clockwise direction relative the driven shaft D and this movement of the herring bone gear 32 will cause the spring 56 to unwind or expand to a greater extent and grip the walls of the pockets 36 and 43 sufficiently to establish a driving connection between the members having these pockets formed therein. The driven shaft member 38 then will be driven in the same direction as the direction of rotation of the herring bone gear 32 and the driven shaft D will be rotated at this second or intermediate speed.

With the mechanism set as just described, should the driven shaft rotate at a higher rate of speed than the speed at which it is being driven from the drive shaft, the driven shaft member 38 will attempt to rotate relative to the herring bone gear 32 and the spring 56 will be wound up or compressed for causing it to release the driven shaft member 38. The driven shaft then may rotate in the same direction of rotation as that of the drive shaft but at a greater speed and under its own momentum. When the speed of rotation of the driven shaft drops back to its driving speed, that is, the speed at which it is being driven by the drive shaft, the herring bone gear 32 will again rotate relative to the driven shaft member 38 for causing the spring 56 to expand and connect the members having the pockets 36 and 43 formed therein.

If it is desired to prevent overrunning or free wheeling in this second speed drive, the gear shift lever G is moved to a greater extent in the same direction and the shifter collar 74 will be moved into the position illustrated in Figure 5. The teeth on the inside of the collar 74 then will bridge between the teeth 36 and 73 formed on the herring bone gear 32 and the driven shaft member 38 respectively, and these members will be connected against relative rotation.

When it is desirable to drive in high speed, the shifter collar 74 is moved from the neutral position disclosed in Figure 1 in an opposite direction to the direction of movement illustrated in Figures 2 and 5. This movement of the collar 74 will shift the ball 52, associated with the spring 46, through the medium of the balls 71, the plunger pins 69, and the cam sleeve 49, in a manner which will be apparent from the description of the second speed drive.

The drive shaft C then will be permitted to drive the driven shaft member 38 through the connection established by the spring 46, and the driven shaft will be operated due to its connection with the member 38.

If it is desired to prevent overrunning in high speed, the collar 74 will be moved to a greater extent in the same direction or until it bridges the sets of teeth 18 and 72. The drive shaft C then will be connected to the driven shaft member 38 to prevent relative rotation between these elements.

If it is desirable to drive in a reverse direction, the shifter lever G is operated to move the gear 81 into mesh with the idler pinion 89. The drive then will be from the drive shaft C through the herring bone gears 16 and 85 to the sleeve 83 and from this sleeve through the gear 88 and the pinion 89 to the gear 81. The driven shaft then will be operated due to the splined connection between the same and the gear 81.

The modified form of transmission illustrated in Figures 6 to 10 inclusive compares in detail features of construction with the form illustrated in Figures 1 to 5 inclusive with the exception of the actuating mechanism for the overruning coiled clutch springs. The elements comparable in detail with those shown in Figures 1 to 5 inclusive, therefore, will only be referred to in a general way.

The drive shaft C has keyed thereto the herring bone gear 100. The drive shaft further is formed with a concentric extension 101 which is hollowed out to form a pocket 102. Formed on the periphery of this portion 101 is a set of teeth 103.

The driven shaft D is provided with the loose herring bone gear 104 which is formed with an annular extension 105. This extension is hollowed out to provide a concentric pocket portion 106. The periphery of the projection 105 is formed with a series of teeth 107.

The driven shaft D is splined at 108 from the supporting bearing structure 109 to the bearing structure 110. This splined portion 108 has positioned thereon and splined thereto a member 111 which will be referred to as the driven shaft member. In Figure 8 it will be seen that this member 111 has the ribs 112 received in grooves 113 of the splined portion 108 of the driven shaft D. The driven shaft member 111 is not provided with a sufficient number of ribs 112 to occupy all of the grooves of the spline 108. The three unoccupied grooves 114 of the spline receive slidable keys 115. These keys are each formed adjacent to its opposite ends with transverse grooves 116 and 117. The grooves 116, formed in the keys 115, are all in circumferential alignment, and the grooves 117 are in circumferential alignment to form two different sets of grooves.

The set of grooves 116 receives a cam sleeve 118 having a camming surface 119. The set of grooves 117 receives a camming sleeve 120 which is formed with a cam surface 121.

At three equi-spaced points around the driven shaft member 111, there are formed radial holes 122. These holes are arranged in pairs and each pair is associated with one of the slidable keys 115. Pins 123 are located in all of the holes 122 and these pins are formed with sharpened or pointed ends 124. Each shiftable key 115 is formed with a pair of longitudinally spaced, conical depressions 125.

It now will be seen that this mechanism is provided with three equi-spaced slidable keys 115 and each key is formed with a pair of longitudinally spaced, conical depressions 125. The driven shaft member 111 further is provided with three pairs of pins 123 and there will be one pin for each one of the conical depressions 125.

The driven shaft member 111 is formed with oppositely projecting extensions 126 and 127. The extension 126 is hollowed out to form a pocket 128 in co-axial alignment with the pocket 102 formed in the drive shaft C. The extension 127 is hollowed out to form a pocket 129 which is concentric with the pocket 106 formed in the herring bone gear 104. The chamber 130 formed by the pockets 102 and 128 receives a coiled clutch spring 131. This clutch spring is anchored at its end 132 to the drive shaft C. The remaining end of the spring is formed with a pair of spaced ears 133, see Figure 9. Positioned between these ears and the cam sleeve 118 is a ball 134.

The chamber 135 formed by the registering pockets 106 and 129 is adapted to receive a coiled clutch spring 136. This spring has its end 137 fastened to the herring bone gear 104. The remaining end of the spring 136 is formed with spaced ears 138 which are of similar construction to the ears 133 shown in Figure 9. A ball 139 is located between the obtusely arranged surface 140 of the end portion of the spring 136, the ears 138 of this spring, and the cam sleeve 120.

A shifter collar 141 is positioned upon the driven shaft member 111 and is formed with inwardly projecting teeth 142, which are received within the grooves formed between the two sets of teeth 143 and 144 of the driven shaft member 111. At three equi-spaced points registering radially with the keys 115, the teeth 142 are cut away to form the camming surfaces 146 and 147.

In Figure 6, the shifter collar 141 is disclosed in what will be termed its neutral position. When in this position, the pins 123 have their inner ends partially seated in the depressions 125 formed in the slidable keys 115. The balls 134 and 139 will be positioned to rest upon flat portions of the sleeves 118 and 120.

In Figure 7, the shifter collar 141 has been moved to the left and the camming surface 146 has acted upon the left hand set of circumferentially aligned pins 123 for moving these pins axially inwardly until their inner pointed ends seat squarely in the centers of the left hand set of depressions 125. This inward movement of one set of pins 123 has caused all of the slidable keys 115 to move to the left. The cam sleeve 120 will be moved by these keys, and the ball 139 will be moved radially by the shifting of the sleeve 120. This radial movement of the ball 139 will cause it to wedge between the end of the spring 136 and the member 111 for compressing the spring axially sufficiently to cause it to expand into slight frictional engagement with the surfaces of the pockets 106 and 129. With the spring 136 lightly engaging the surfaces of these pockets, rotation of the herring bone gear 104 in a clockwise direction, as viewed from the front of the transmission, will cause the spring to be unwound or expanded for tightly gripping the surfaces of the pockets 106 and 129. The herring bone gear 104 and the driven shaft member 111 then will be connected for a drive from the herring bone gear to the member 111. Should the member 111 rotate at a higher rate of speed than the herring bone gear, the spring 136 will be wound up or contracted for releasing its gripping engagement with the surfaces of the pockets. The driven shaft member 111 then will be permitted to overrun with respect to the herring bone gear.

Figure 10 discloses the shifter collar 141 moved to the left to a greater extent than that illustrated in Figure 7. The teeth 142 of the collar 141 now will bridge between the teeth 107 of the herring bone gear 104 and the teeth 144 of the driven shaft member 111 for locking this member and the herring bone gear against relative rotation. In other words, with the shifter collar in this position, overrunning will be prevented.

When the shifter collar is moved in the opposite direction to the direction illustrated in Figure 7, the remaining set of circumferentially aligned pins 123 will be moved inwardly by the camming surface 147 for shifting the keys 115 longitudinally in the opposite direction. This shifting of the keys through the medium of the right hand pins 123 will cause the left hand pins to be moved longitudinally outwardly. The shifting of the collar 141 will continue until the right hand set of pins 123 is entirely seated within the right hand set of depressions 125. This longitudinal movement of the keys 115 to the right will permit the spring 136 to expand axially and thus contract radially and will cause the ball 134 to be moved outwardly into compressing engagement with the end of the spring 131. This latter spring then will be conditioned for establishing one way driving connection between the drive shaft C and the driven shaft member 111 but will permit the driven shaft member to overrun with respect to the drive shaft. Further movement of the shifter collar 141 in this same direction will cause its teeth 142 to bridge the teeth 103 and 143 formed on the peripheries of the drive shaft and the driven shaft member 111 for preventing overrun or relative movement between the drive shaft and this member 111.

The driven shaft further is provided with a slidable gear 148 which corresponds with the gear 81 in the transmission illustrated in Figure 1.

The counter shaft E has rotatably positioned thereon a sleeve 149 which has keyed thereto the herring bone gears 150 and 151. These gears compare with the gears 85 and 86 of the sleeve 83 in the form of transmission illustrated in Figure 1 and mesh with the herring bone gears 100 and 104. The sleeve 149 has formed integral therewith the gears 152 and 153. The gear 152 is positioned for meshing with the gear 148 when the latter is moved axially of the driven shaft D. The gear 153 meshes with an idler pinion 154. The gear 148 may be selectively moved into meshing engagement with this idler pinion 154.

In view of the fact that the first speed drive and the reverse drive are identical in the two different forms of transmission, the operation of these drives in the form shown in Figure 6 will not be described.

The operation of the overrunning clutch drives will now be set forth in detail for the form shown in Figures 6 to 10 inclusive.

When it is desired to drive the driven shaft through the second or intermediate speed drive, the shifter collar 141 is moved into the position illustrated in Figure 7. The spring 136 then will be compressed and slightly expanded into light gripping engagement with the pocketed portions of the herring bone gear 104 and the driven shaft member 111. The drive in second speed then will be from the drive shaft C through the counter shaft and its associated elements to the herring bone gear 104. This gear will rotate in a clockwise direction, as viewed from the front end of the transmission, and will unwind the spring 136 for expanding it into driving gripping engagement with the pocketed portions of the gear 104 and the driven shaft member 111. As has been explained above, if it is desirable to dispense with this overrunning drive connection, the shifter collar 141 may be moved to bridge across the teeth 107 and 144 for locking the herring bone gear 104 and the driven shaft member 111 against relative rotation.

When it is desired to drive the driven shaft through the high speed drive connection, the shifter collar 141 is moved to the right in Figures 6 and 7, and the spring 131 will be conditioned for connecting the drive shaft to the driven shaft member 111. This connection will permit overrunning of the driven shaft member relative to the drive shaft. To prevent this overrun the collar 141 will be moved to a greater extent to the right for bridging across the two sets of teeth 103 and 143. The high speed drive then will be from the shaft C through the shifter collar 141 to the driven shaft member 111 and from this member to the driven shaft D.

It now is believed that the detail features of construction and modes of operation of the two different forms of transmissions will be clearly understood by those skilled in the art.

It is to be understood that the forms of this invention herewith shown and described are illustrative only and are to be taken as examples of the same, and that formal changes and changes in the shape, size and arrangement of parts may be resorted to without departing from the spirit of the invention or the scope of the subjoined claims.

What I claim is:

1. In transmission mechanism, a drive shaft, a driven shaft, means for driving the driven shaft from the drive shaft comprising, a member driven by the drive shaft, a member connected to the driven shaft, said members being axially aligned and each provided with a pocket, a coiled spring housed in said pockets, said coiled spring having one end fastened to one of said members, and means for selectively expanding the spring to permit the member connected to the driven shaft to be driven by the member of the drive shaft or to permit overrun of the driven shaft member relative to the drive shaft member; and means movable to encircle both of said members for connecting them against relative rotation in either direction.

2. In transmission mechanism, a drive shaft, a driven shaft, means for driving the driven shaft from the drive shaft, said means including a member driven by the drive shaft, a member connected to the driven shaft, said members being axially aligned and each provided with a pocket, a coiled spring housed in said pockets, said coiled spring having one end fastened to one of said members, and means for selectively expanding the spring slightly to cause rotation of the first member in one direction relative to the second member, to further expand the spring into gripping driving engagement with both members to cause rotation of said members in unison in the same direction and to contract the spring out of gripping driving engagement to permit overrun of the second member relative to the first member; and means encircling both of said members for connecting them against relative rotation in either direction.

3. In transmission mechanism, a drive shaft, a driven shaft, two members loosely encircling the driven shaft and driven by the drive shaft at two different speeds, a member connected to the driven shaft to rotate therewith and located between the said loose members, the driven shaft member having a pocket opening toward each of the loosely encircling members, the loosely encircling members each having a pocket opening toward its respective pocket in the driven shaft member, and means housed in each set of pockets for connecting the members to permit the driven shaft member to be driven by either of the loosely encircling members or to permit the driven shaft member to overrun under its own momentum relative to said loosely encircling members; and means for connecting either of said encircling members and said member connected to said driven shaft against relative rotation in either direction.

4. In transmission mechanism, a drive shaft, a driven shaft, two members loosely encircling the driven shaft and driven by the drive shaft at two different speeds, a member connected to the driven shaft to rotate therewith and located between the said loose members, the driven shaft member having a pocket opening toward each of the loosely encircling members, the loosely encircling members each having a pocket opening toward its respective pocket in the driven shaft member, and a coiled spring housed in each set of pockets for connecting the members to permit the driven shaft member to be driven by either of the loosely encircling members or to permit the driven shaft member to overrun under its own momentum relative to said loosely encircling members; and means for connecting either of said encircling members and said member connected to said driven shaft against relative rotation in either direction.

5. A transmission mechanism comprising, a drive shaft, a flanged gear on said drive shaft, a driven shaft in axial alignment with said drive shaft, a flanged gear rotatably mounted on said driven shaft spaced from the gear on said drive shaft, a double flanged annular member non-rotatably mounted upon said driven shaft between said flanged gears, one-way clutch means in the chambers provided by the flanges on said gears and said annular member, manually actuatable means carried by said annular member adapted to selectively render said one-way clutch means operative or inoperative, and positive clutch means operative upon further movement of said manually actuatable means to provide a two-way drive between either of said flanged gears and said driven shaft.

6. A variable speed transmission mechanism comprising, a drive shaft, a flanged gear on said drive shaft, a driven shaft, a flanged change-speed gear rotatably but axially immovably mounted on said driven shaft spaced from the gear on said drive shaft, a double flanged annular member non-rotatably mounted on said driven shaft between said flanged gears, coil springs in the annular chambers formed by the flanges on said gears and said annular member, a ring surrounding said annular member manually shiftable to selectively cause either of said coil springs to couple its respective gear with said annular member to provide a one-way drive between said gear and said driven shaft, and positive clutch means operative upon further shifting of said ring to provide a two-way drive between either of said gears and said driven shaft.

7. A free-wheeling clutch for a variable speed transmission comprising, a pair of flanged driving elements in axial alignment with each other adapted to operate at different speeds, a flanged driven element positioned between said driving elements in axial alignment therewith, one-way clutch means operative to engage said flanges to couple either of said driving elements to said driven element to provide a one-way drive therebetween, and manually actuated means for selectively rendering said one-way clutch means operative and for providing a two-way drive.

8. A free-wheeling clutch for a variable speed transmission comprising, a pair of flanged driving elements in axial alignment with each other adapted to operate at different speeds, a flanged driven element positioned between said driving elements in axial alignment therewith, a coiled clutch spring associated with each of said driving elements each being engageable with said driven element to provide a one-way drive between either of said driving elements and said driven element, and manually actuated means for selectively rendering said clutch springs operative and also providing a two-way drive.

9. A free-wheeling clutch for a variable speed transmission, comprising, a pair of driving elements in axial alignment with each other adapted to operate at different speeds, an annular flange on each of said driving elements, a driven element positioned between said driving elements in axial alignment therewith, annular flanges on said driven element, a pair of coiled clutch springs operative to frictionally engage said flanges to provide a one-way drive between either of said driving elements and said driven element, and a manually actuated ring carried by said driven element operative to selectively render said clutch springs operative and also provide a two-way drive between either of said driving elements and said driven element.

10. In transmission mechanism, a drive shaft, a driven shaft, means for driving the driven shaft from said drive shaft comprising, a member driven by said drive shaft, a member connected to said driven shaft, said members being axially aligned and provided with a pocket, a coiled spring housed in said pocket for connecting said members to provide a one-way drive, and means including a plurality of keys and plungers movable relative thereto for selectively expanding said spring to permit the member connected to the driven shaft to be driven by the member of the drive shaft to provide a one-way drive.

11. In transmission mechanism, a drive shaft, a driven shaft, independent devices for driving the driven shaft from the drive shaft at different speeds, said devices each including a member driven by the drive shaft, a member connected to the driven shaft, said members being axially aligned and each provided with a pocket, a coiled spring housed in each of said pockets for connecting said members to provide for a one-way drive, and means carried by the member connected to said driven shaft movable in opposite direction to selectively engage the members driven by the drive shaft to provide two-way drive.

12. In a transmission mechanism, a drive shaft, a driven shaft, independent devices for driving the driven shaft from the drive shaft at different speeds, said devices each including a member driven by the drive shaft, a member connected to the driven shaft, said members being axially aligned and of equal diameters, spring means for connecting said members to provide a one-way drive, and shiftable means for causing said connection, said last means being shiftable further in the same direction for connecting said members to provide a two-way drive.

GUY M. HARTSOCK.